United States Patent [19]

Swanson

[11] Patent Number: 5,680,210
[45] Date of Patent: Oct. 21, 1997

[54] INTERFEROMETRIC TARGET DETECTING APPARATUS HAVING A LIGHT SOURCE WITH MORE LORENTZIAN THAN GAUSSIAN SPECTRAL COMPONENTS

[75] Inventor: Nancy L. Swanson, Panama City Beach, Fla.

[73] Assignee: The United States of America as represented by the Secretary of the Navy, Washington, D.C.

[21] Appl. No.: 584,641

[22] Filed: Jan. 5, 1996

[51] Int. Cl.$^6$ .................................................. G01B 9/02
[52] U.S. Cl. .................................. 356/345; 356/353
[58] Field of Search ............................ 356/345, 353, 356/354

[56] References Cited

U.S. PATENT DOCUMENTS

| 4,259,015 | 3/1981 | Wada | 356/336 |
| 4,744,659 | 5/1988 | Kitabayashi | 356/356 |

*Primary Examiner*—Samuel A. Turner
*Attorney, Agent, or Firm*—Harvey A. Gilbert; William C. Townsend

[57] ABSTRACT

An apparatus for eliminating scattered light from unscattered light (signal) in the reflection from a laser-illuminated target and its ambient. The apparatus uses a laser selected for maximum Lorentzian to Gaussian mode content, a stable interferometer having an optical path difference twice the distance to the first zero in the Gaussian pattern of the scattered interferogram, and performs subtraction of the background or scattered interferogram from the unscattered or signal interferogram. The laser is multi-mode and the interferometer is a Fizeau wedge having an optical path difference equal to twice the distance to the first zero in the Gaussian interferogram. The method of making the apparatus is provided.

17 Claims, 7 Drawing Sheets

SIGNAL FRINGES

SIGNAL FRINGESNOISE FRINGES (SCATTERED LIGHT)

1

INTERFEROMETRIC TARGET DETECTING APPARATUS HAVING A LIGHT SOURCE WITH MORE LORENTZIAN THAN GAUSSIAN SPECTRAL COMPONENTS

INTRODUCTION

The present invention relates to real-time laser image processing. More specifically, my invention is a device for enhancing a laser-created image and a method of designing and using said device. In particular, the present invention uses an interferometer to enhance a laser-created image by separating reflected background from reflected target light.

BACKGROUND OF THE INVENTION

There are presently a number of optical methods for reducing scattered light in order to improve image quality, range, and detection for a laser imaging system.

The Range Gating (RG) method works by using a pulsed laser and timing the camera shutter to open for the desired return signal. The camera is turned on for only a few nanoseconds. Thus, only light from a slice of water (fog, etc.) arrives at the detector. All the backscattered light from the volume in front of that slice (or gate) is effectively eliminated. Limitations include the fact that all light backscattered inside the slice (gate) still gets into the detector. This method does not reduce small angle forward scattered light which blurs the image.

The Laser Line Scanning (LLS) method employs a thin, pencil beam which is scanned across a "scene" and detected by a single photo-detector. The image must be reconstructed from successive photo-detector readings. The backscatter is minimized by source-receiver separation. Its limitations include the fact that the LLS does not correct for multiple scattering in the forward direction. There is also some backscattered light which enters the detector due to limitations in detector size and, therefore, source-receiver separation distance.

In the filter method, narrow bandwidth filters are employed to block all but a narrow range of wavelengths. This works well for filtering ambient background (sunlight) but not scattered light from the laser itself.

Another method employs confocal systems. This method employs a system of lenses, pinholes and camera. This can be used in conjunction with either the range gating or the laser line scanning systems. Only light from the focal volume of the collection lens is focused at the pinhole (the "in focus" volume). Light which does not originate from the in focus volume does not focus at the pinhole and is blocked from entering the detector. Limitations include the fact that light originating from any point on-axis will arrive at the pinhole and enter the detector, regardless of whether or not it originated inside the focal volume. Additional problems occur due to lens aberrations. The width of the focal volume increases with the distance of the target from the detector. Ideally, the width should be as small as possible. Thus, for long viewing distances, this method becomes less effective.

SUMMARY OF THE INVENTION

It is thus an object of the present invention to provide a means for separating unscattered light constituting signal from a combination of unscattered and scattered light.

It is yet another object of the present invention to provide an interferometric means for separating unscattered light from combined unscattered and scattered light.

It is still another object of the present invention to provide a stable and reliable interferometric means for filtering light returned from a target immersed in a turbid media such as fluid, smoke, etc., to extract unscattered signal from a combination of signal and scattered background light.

The present invention, the Interferometric Image Enhancement Device (IIED) uses an interferometric means to filter or separate laser light representing signal from light returned by a laser-illuminated target immersed in a turbid medium and containing both the signal or unscattered light and scattered light or background.

The invention includes a laser ideally having Lorentzian modes. To produce a laser having a spectral profile comprised of mostly Lorentzian modes requires that the resonant cavity of the laser have precisely fabricated elements. Reflectivity and parallelism of critical surfaces is paramount. The Lorentzian profile of the laser modes and the precision and the stability of the interferometer combine to maximize the fringe output and eliminate the background scattered light. A multi-mode laser is used.

The interferometer used is a Fizeau wedge for stability and reliability. By selecting an appropriate optical path difference, light having its bandwidth broadened by scattering processes operating in the target area can be separated from accompanying signal. The wedge is sized and configured to provide a path difference equal to twice the distance of the first zero in the fringe intensity function for pure Gaussian modes. Fringes present in the output are from the unscattered laser signal. Accompanying scattered light does not produce any fringes. It does provide a constant background or offset.

Fringe detection means are located in the focal plane where the fringes are of maximum clarity and intensity. The background light level detected between fringes and the fringe intensities are subtracted to obtain the unscattered signal.

The invention as summarized, with all of its attendant benefits, features, and advantages will be more clearly understood when the following detailed description is considered in conjunction with the accompanying drawings.

DETAILED DESCRIPTION

Discussion of Science

It is of fundamental importance to recognize that coherence length is inversely proportional to the width of the power spectrum. Therefore, as the spectrum broadens, the coherence length decreases. Thus, if laser (coherent) light is scattered from an optically dense, dynamic medium such as a liquid or gas, an energy exchange with the medium occurs. This causes the spectrum to be broadened with an associated loss in temporal coherence. The broadened spectrum has a Voigt profile with a predominant Gaussian width. This implies that the broadening mechanism is a random Gaussian process.

Figure 1:
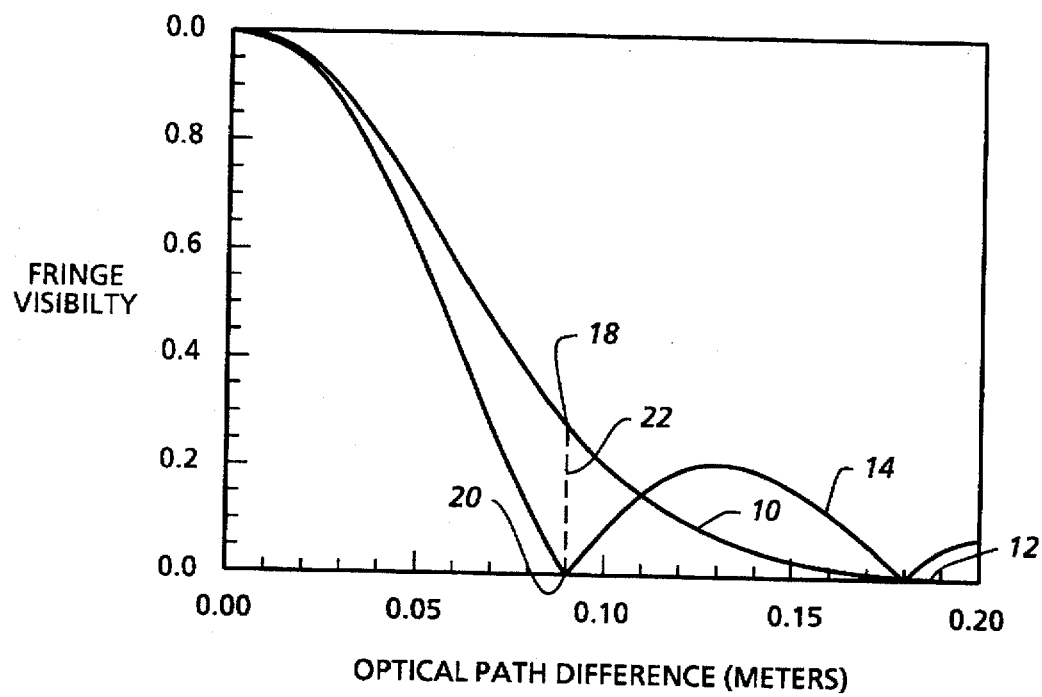
FIG. 1 depicts Lorentzian and Gaussian fringe visibility functions.

The present invention takes advantage of the fact that, if the spectral modes of the laser are Lorentzian, the first zero in the fringe visibility function is many centimeters greater than the first zero if the modes are Gaussian. In the ideal laser, the modes are pure Lorentzian. The non-ideal laser has a combination of Lorentzian and Gaussian modes. For the purposes of the present invention, a laser having a maximum of Lorentzian modes is specified. Thus, as shown in FIG. 1, where the laser light is unscattered, the Lorentzian profile 10 of the laser modes will approach its first zero 12 more gradually than will the profile 14 of the scattered light which will reach its first zero 16 earlier. The result as depicted in FIG. 1 is that the fringe intensity of the unscattered light 18 is a maximum and the fringe intensity of the scattered light 20 is minimum (zero). The difference 22 corresponds to the maximum signal without any scattered light contribution. It is this result that provides the basis for the present invention.

The invention ideally contemplates a laser having a Lorentzian spectral profile and a perfectly stable interferometer having an optical path difference consistent with the particular application. Realistically, the laser is a multi-mode type having a maximized Lorentzian spectral profile. The interferometer can be a Fizeau wedge which in my evaluations provided an acceptable level of stability. The optical path difference in the wedge is a function of wedge thickness and configuration and the distance to the first Gaussian zero in the interferogram. A means for subtracting the Lorentzian and Gaussian outputs can be any commonly used subtraction circuit known to those skilled in the art.

An understanding of the temporal coherence properties of optical signals scattered in water is required for the optimum system design. It can be shown that the coherence length is inversely proportional to the width of the power spectrum, therefore as the spectrum broadens, the coherence length decreases. If the light scattered from a dynamic, optically dense medium (liquid or dense gasses) undergoes an energy exchange with the medium, the spectrum will be broadened and there will be a loss in temporal coherence. Scattering from a stationary medium (solids) does not produce a broadening because the scattering particles are not in motion and no energy exchange can take place, therefore, the scattered light suffers no loss in temporal coherence The spectrum scattered from diatomaceous earth (DE) and also from polystyrene spheres suspended in water was measured using a variety of methods having resolutions from a few kilohertz to several hundred gigahertz. The laser was a single-mode argon-ion operating at 514.5 nm with a Voight spectral profile with a predominant Lorentzian component. Measurements of the scattered spectrum were taken of the laser in air, clear water and successive additions of scattering particles (DE or spheres). Using a Fabry-Perot spectrometer with a bandwidth of 1.5 MHz, a 45% loss in coherence length results.

Figure 2:
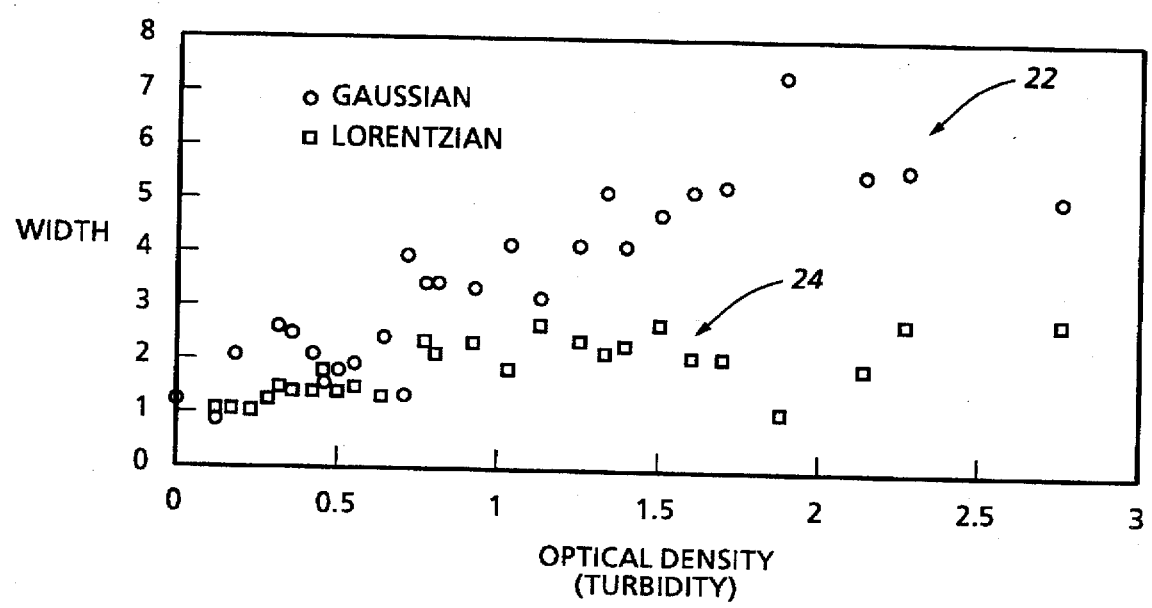
FIG. 2 is a graph comparing Gaussian and Lorentzian widths versus optical density (turbidity) for diatomaceous earth used as the scattering medium.

The total change in bandwidth from the laser in air to very turbid water was 1.3 MHz. The broadened spectrum has a Voigt (convolution of Lorentzian and Gaussian) profile with a predominant Gaussian width. This implies that the broadening mechanism is a random Gaussian process. FIG. 2 depicts the relative Gaussian 22 and Lorentzian 24 widths as a function of adding diatomaceous earth to the water to increase optical density. The Lorentzian width of 1.5 MHz is the spectral profile of the spectrometer and remains constant throughout the data gathering.

Figure 3:
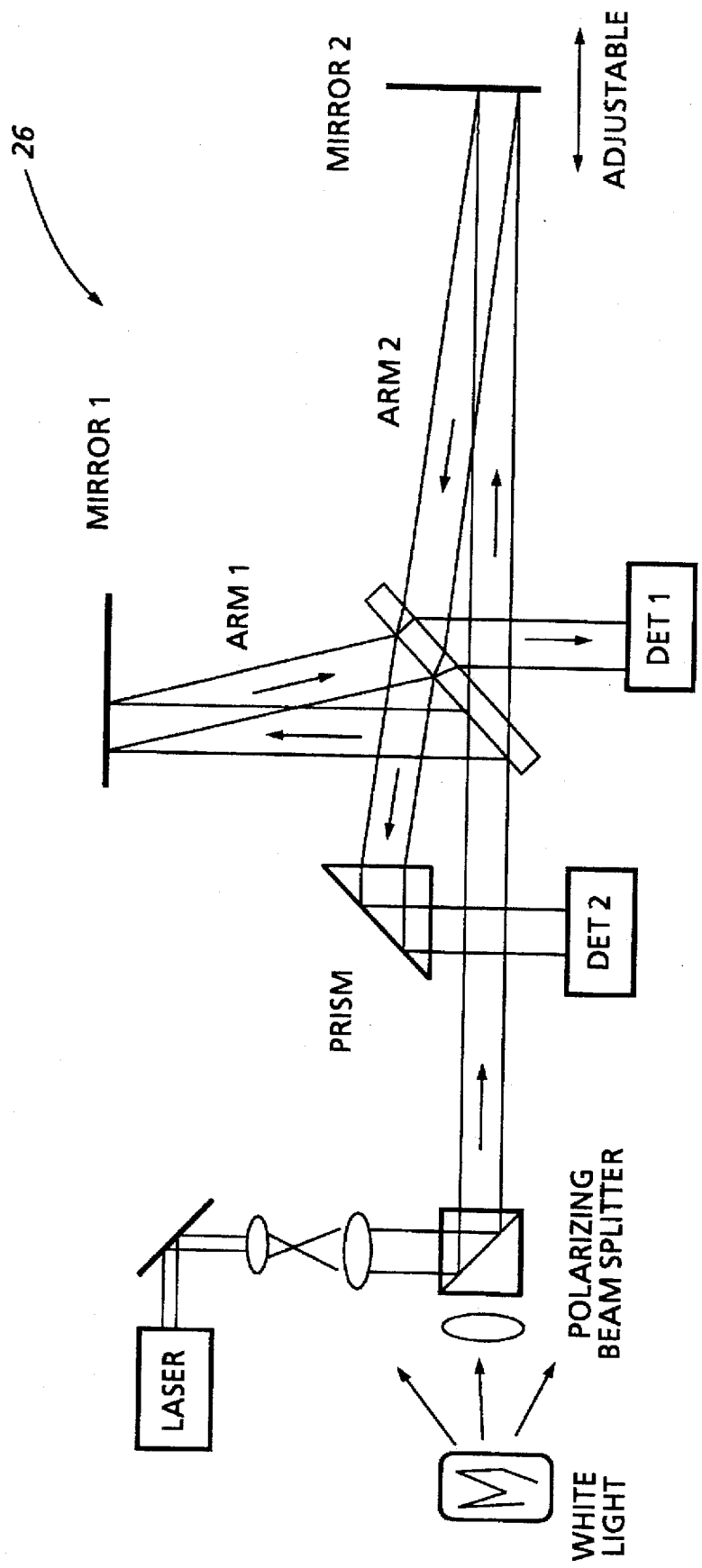
FIG. 3 is a functional diagram of a Michelson interferometer.

FIG. 3 is a representation of a Michelson Interferometer 26 in an experimental setup used to obtain the data in FIGS. 4A, 4B, 4C, and 4D. The data shows the 180 degrees phase shift in the detected output signals 28 and 30 between the two arms of the interferometer. It also shows that subtraction of the output of the two interferometer arms eliminates the constant background while retaining the pattern information. The bottom signal 32 in each of the FIGS. 4A, 4B, 4C, and 4D is the result of subtraction of the two top signals. It should be noted that the representation of white light in FIGS. 4A does not display fringes since the path difference in the interferometer is outside the coherence length.

Most lasers operate in a multi-mode configuration. Argon-ion lasers have about 17 modes under a Gaussian envelope. The Gaussian envelope has a width on the order of a few gigahertz whereas the individual modes have a width of a few megahertz. Clearly, a spectral broadening of a few megahertz will not affect the overall Gaussian packet but only the individual modes. A calculation was performed to determine the intensity of fringes produced by an interferometer versus optical path difference for the single-mode case. The result is either a Gaussian or a Lorentzian packet, depending on the spectral profile of the single mode, with a cosine modulation term representing the fringes. The calculation was then extended to the multi-mode case.

The mathematical basis for the Interferometric Image Enhancement Device, the present invention and, specifically, the plots in FIG. 5 are as follows. The coherence length is a loosely defined quantity. One definition is the optical path difference in an interferometer after one of the mirrors has been moved until interference fringes are no longer visible. Even mathematical definitions differ. The only criterion seems to be that the coherence length must be inversely proportional to the bandwidth of the spectrum. The definition of coherence length used here is as follows.

The autocorrelation function of the fields is given by $$\Gamma(\tau) = <E^*(t)E(t+\tau)> = \int_{-\infty}^{\infty} I(\omega)e^{i\omega\tau}d\omega \qquad (1)$$

so that the autocorrelation of the fields and the spectrum are Fourier transform pairs. The degree of coherence is defined as $$C(\tau) = \frac{\Gamma(\tau)}{\Gamma(0)} \qquad (2)$$

and the coherence time as $$\tau_c = \int_{-\infty}^{\infty} |C(\tau)|^2 d\tau \qquad (3)$$

The coherence length is then $l_c = c\tau_c$. If the spectrum is Gaussian with a standard deviation $\sigma$, the coherence length works out to $$l_c = \frac{c\sqrt{\pi}}{\sigma}.$$

If the spectrum is Lorentzian with half width at half height of $\gamma$, the coherence length is $$l_c = \frac{c}{\gamma}.$$

If the power spectrum is measured, the coherence length can be calculated.

These definitions of coherence length are next connected with the coherence length defined as the optical path difference in the interferometer when fringes are no longer visible. The intensity as a function of the distance the mirror is moved is written $$I(x) = \int_0^\infty (1 + \cos(kx))G(k)dk \qquad (4)$$

where $\omega = ck$ and $G(k)$ is the spectrum as a function of wave number. $I(x)$ can be simplified to $$I(x) = \int_0^\infty G(k)dk + \int_0^\infty G(k)\left\{\frac{e^{ikx}+e^{-ikx}}{2}\right\}dk \qquad (5)$$

$$= \frac{1}{2}I(0) + \frac{1}{2}\int_0^\infty G(k)e^{ikx}dk + \frac{1}{2}\int_{-\infty}^0 G(k)e^{ikx}dk$$

$$= \frac{1}{2}I(0) + \frac{1}{2}\int_{-\infty}^\infty G(k)e^{ikx}dk$$

Define a function $$P(x) = \int_{-\infty}^\infty G(k)e^{ikx}dk \qquad (6)$$

such that $$2I(x) = I(0) + P(x) \qquad (7)$$

or $$P(x) = 2I(x) - I(0).$$

$P(x)$, the interferogram, represents intensity as a function of mirror position x, extended to include negative values. If the spectrum $G(k)$ is known, then the intensity function can be calculated from its Fourier transform in Equation (6). From here mathematical functions for $G(k)$ are assumed and the intensity function $P(x)$ is calculated.

I. Single-mode Gaussian.

If the spectrum is a single Gaussian, then $$G(k) = \frac{c}{\sqrt{2\pi}\sigma} e^{-\frac{c^2(k-k_0)^2}{2\sigma^2}}. \qquad (8)$$

By the shift theorem, $P(x) = \tilde{G}(k-k_o) = \cos(k_o x)\tilde{G}(k)$ where $(\sim)$ indicates the Fourier transform. Thus, $$P(x) = \frac{\cos(k_o x)}{\sqrt{2\pi}\frac{\sigma}{c}} \int_{-\infty}^\infty e^{-\frac{c^2 k^2}{2\sigma^2}} e^{ikx}dk. \qquad (9)$$

Effecting the integration gives $$P(x) = \cos(k_o x) e^{-\frac{\sigma^2 x^2}{2c^2}}. \qquad (10)$$

This is a Gaussian packet with a cosine modulation representing the interference fringes. The coherence length is defined as the value of x when the intensity, $P(x)$ drops to $1/e$ of its maximum value, i.e.

$$\frac{\sigma^2 x^2}{2c^2} = 1 \qquad (11)$$

or $$x = \frac{\sqrt{2}\ c}{\sigma},$$

Compare this result to $$l_c = \frac{\sqrt{\pi}\ c}{\sigma},$$

the previous result for a Gaussian distribution.

II. Single-mode Lorentzian.

If the spectrum is a single Lorentzian then $$G(k) = \frac{\gamma}{c\pi}\ \frac{1}{(k-k_o)^2 + \left(\frac{\gamma}{c}\right)^2} \qquad (12)$$

Following the same procedure as in (I.) gives $$P(x) = \cos(k_o x) e^{-\frac{\gamma x}{c}}. \qquad (13)$$

This has the same cosine modulation term as the Gaussian but the packet is a decreasing exponential instead of a Gaussian. When $$P(x) = 1/e, x = \frac{c}{\gamma}.$$

This is the exact same result for the coherence length obtained with the previous method.

III. Gaussian modes under Gaussian envelope

When the spectrum has many modes which are all Gaussian under a Gaussian envelope, the spectrum can be written $$G(k) = \frac{c}{\sqrt{2\pi}\ \Sigma} e^{-\frac{c^2(k-k_o)^2}{2\sigma^2}} \sum_{n=-N}^N e^{-\frac{c^2(k-k_o-n\Delta)^2}{2\Sigma^2}}. \qquad (14)$$

where $\Sigma$ is the standard deviation of the modes, $\sigma$ is the standard deviation of the envelope and $\Delta$ is the frequency difference between modes. n is the mode number where n=0 is at the center of the envelope. The total number of modes is $2N+1$ and is dependent on the type of laser. Following the same procedure as (I.) and (II.), the interferogram is the Fourier transform of the spectrum in Equation (14) which, under the assumption that $\Sigma \ll \sigma$, works out to $$P(x) = \cos(k_0 x) e^{-\frac{\Sigma^2 x^2}{2c^2}} \sum_{n=-N}^N e^{-in\frac{\Delta}{c}}. \qquad (15)$$

By simplifying the summation term and defining a function $W(x)$ as the normalized intensity function, the result is $$W(x) = \qquad (16)$$

$$\frac{P(x)}{P(0)} = \frac{\cos(k_0 x) e^{-\frac{\Sigma^2 x^2}{2c^2}}}{2N+1}\left\{2\sum_{n=0}^N\left\{\cos\left(\frac{xn\Delta}{c}\right)\right\} - 1\right\}$$

Figure 4A:
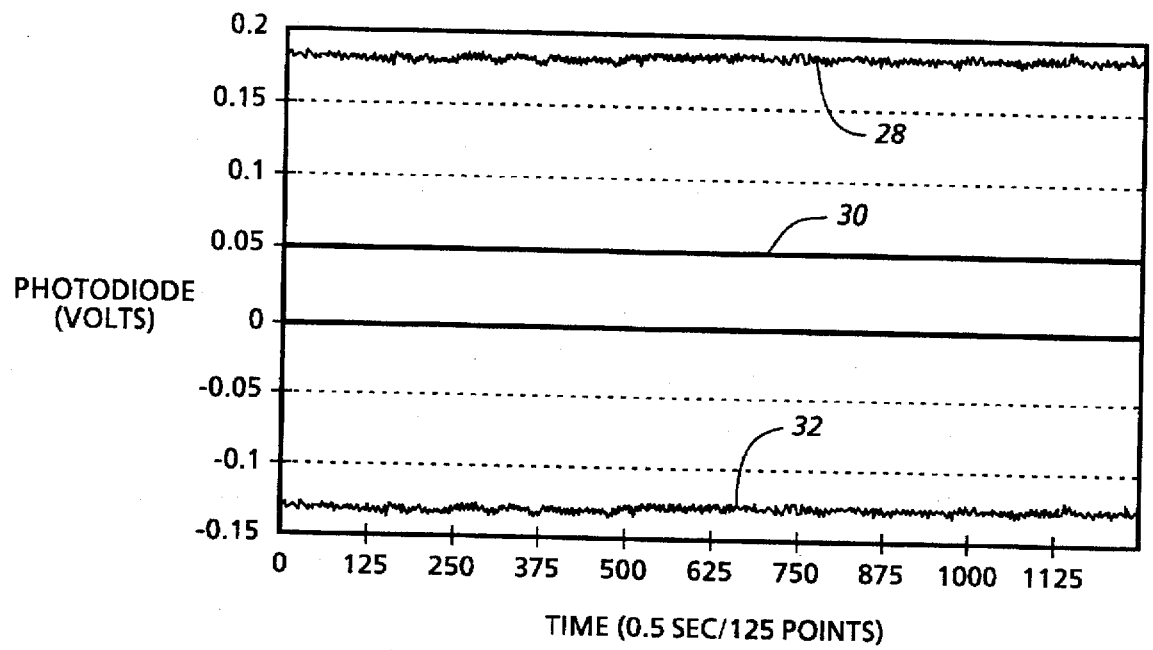
FIGS. 4a–d are group of graphs depicting data obtained from the Michelson interferometer of FIG. 3.
Figure 4B:
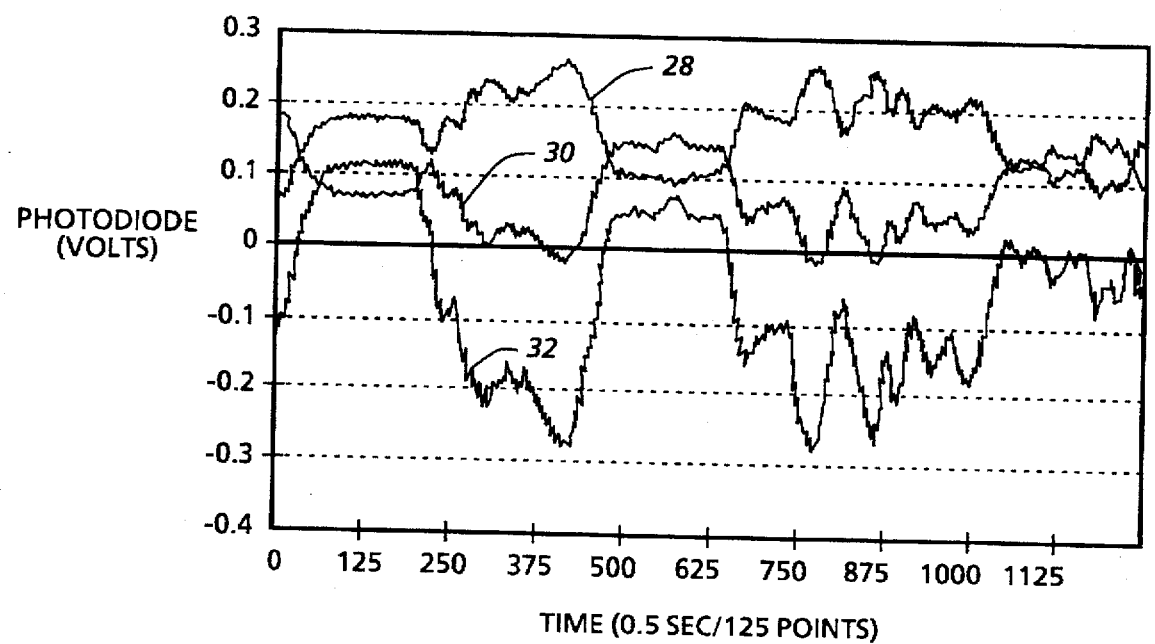
Figure 4C:
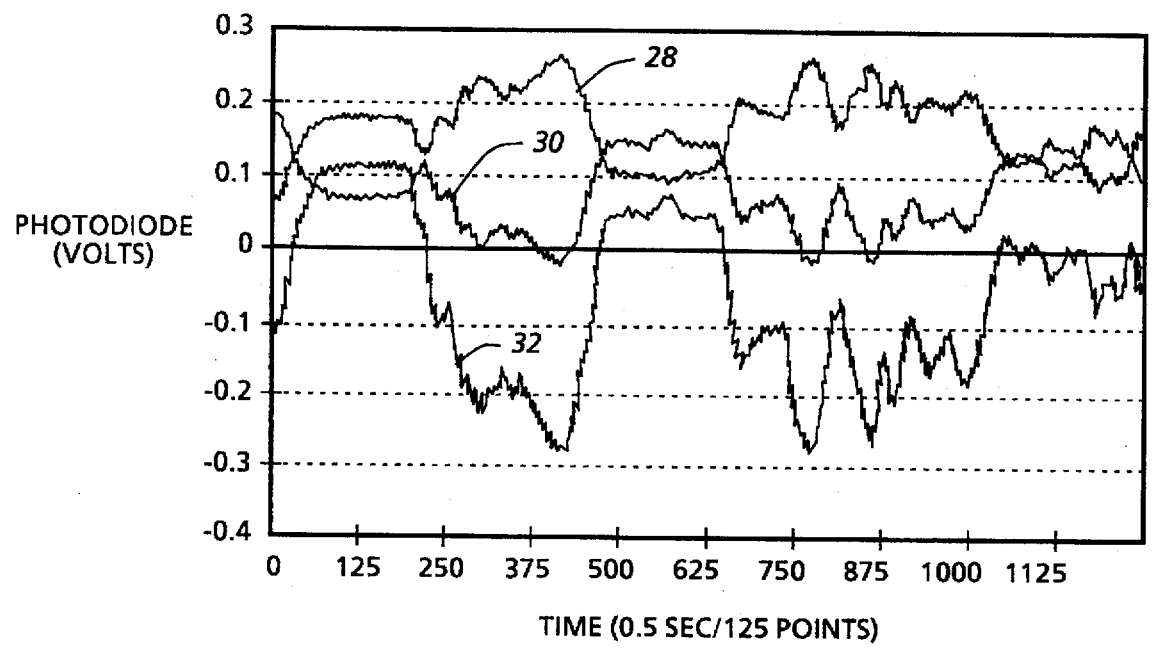
Figure 4D:
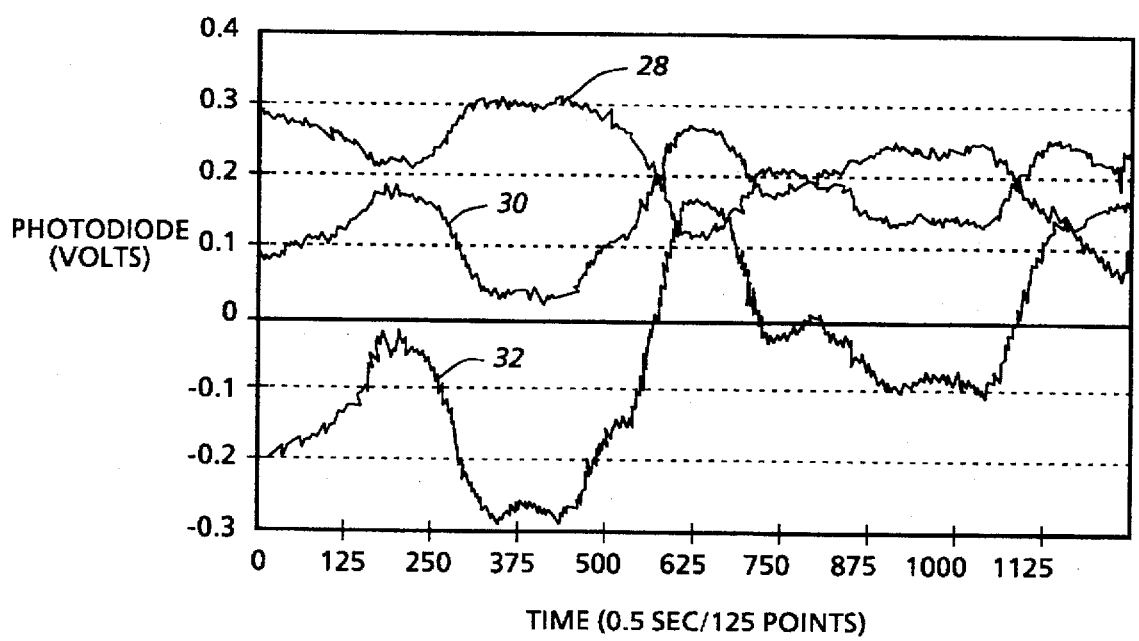

This is the function plotted in FIG. 4b. It should be noticed that the functional form is the same as in Equation (10) except for the addition of the summation. The summation term is dependent only on the number of modes present and the frequency difference between modes. This is the intermediate structure term which causes the envelope in FIG. 4b to oscillate on the centimeter scale. Note that when only the n=0 term is taken in the sum, Equation (16) reduces to Equation (10) for a single Gaussian mode.

IV. Lorentzian modes under Gaussian envelope

For the case of Lorentzian modes under a Gaussian envelope the spectrum is written $$G(k) = \frac{\gamma}{c\pi} e^{-\frac{c^2(k-k_0)^2}{2\sigma^2}} \sum_{n=-N}^{N} \frac{1}{(k-k_0-n\Delta)^2 + \left(\frac{\gamma}{c}\right)^2} . \quad (17)$$

Again, following the same procedure as in (I.), (II.) and (III.), gives $$P(x) = \cos(k_0 x) e^{-\frac{\gamma x}{c} + \frac{x^2}{2\sigma^2}} \sum_{n=-N}^{N} e^{in(\frac{x\Delta}{c} - \frac{\gamma\Delta}{\sigma^2}) - \frac{n^2\Delta^2}{2\sigma^2}} . \quad (18)$$

The normalized interferogram is $$W(x) = \frac{\cos(k_0 x) e^{-\frac{\gamma x}{c}}}{2 \sum_{n=0}^{N} \left\{ \cos\left(\frac{n\Delta\gamma}{\sigma^2}\right) e^{-\frac{n^2\Delta^2}{2\sigma^2}} \right\} - 1}$$

$$\left\{ 2 \sum_{n=0}^{N} \left\{ \cos\left(\frac{nx\Delta}{c} - \frac{n\Delta\gamma}{\sigma^2}\right) e^{-\frac{n^2\Delta^2}{2\sigma^2}} \right\} - 1 \right\} \quad (19)$$

which is plotted in FIG. 4a. The functional form is the same as in Equation (13) except for the summation terms. Again, the summation term is dependent only on the number of modes present and the frequency difference between modes. This causes the envelope in FIG. 4a to oscillate on the centimeter scale. The exponential term in the sum is not present in Equation (16) for the Gaussian case. For a large separation between modes $\Delta$, this exponential quickly damps the sum to zero so that only the first two terms contribute. On the other hand, when $\Delta<<\sigma$, the exponential term is approximately equal to one for all n. In this case the intermediate structure of Equation (19) becomes very like that in Equation (16), the Gaussian case. When $\Delta$ is equal to the width of the modes, the curve is more or less solid under the Gaussian curve. Although it may not be obvious from inspection of Equations (16) & (19), the plots in FIGS. 4a and 4b converge to an envelope with a coherence length at 1/e consistent with that of the Gaussian envelope.

Figure 5A:
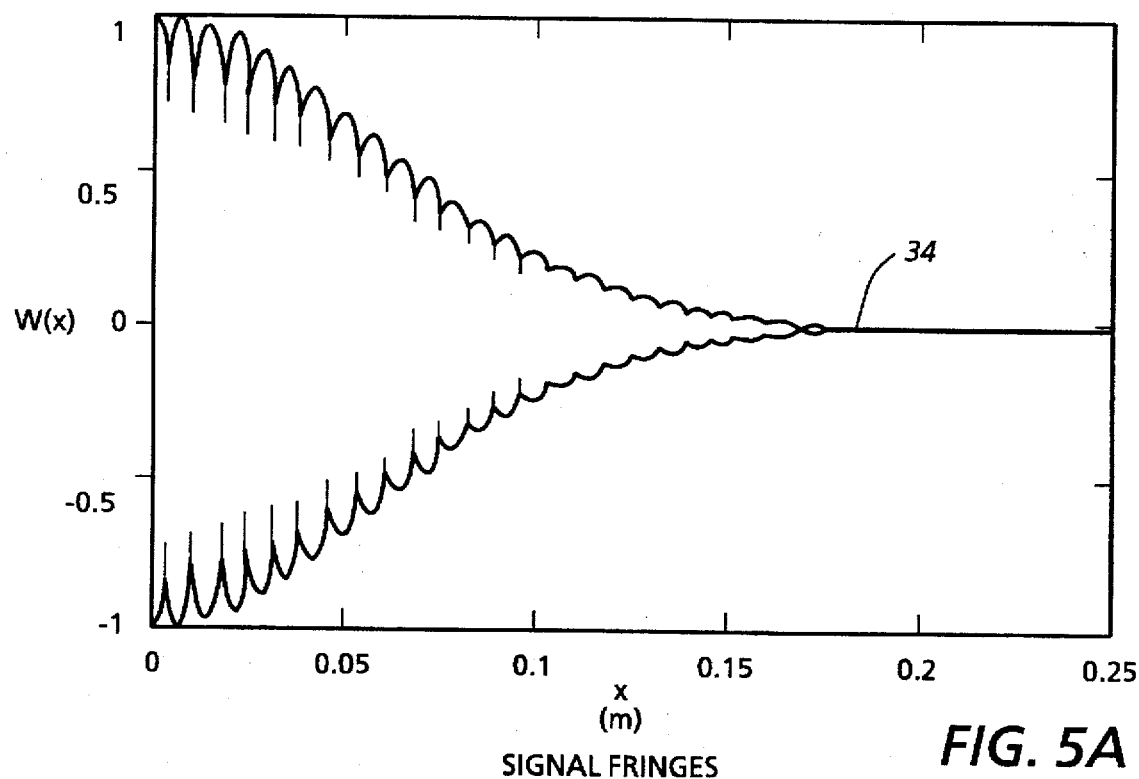
FIG. 5a is an interferogram from an input of Lorentzian modes under a Gaussian envelope.
Figure 5B:
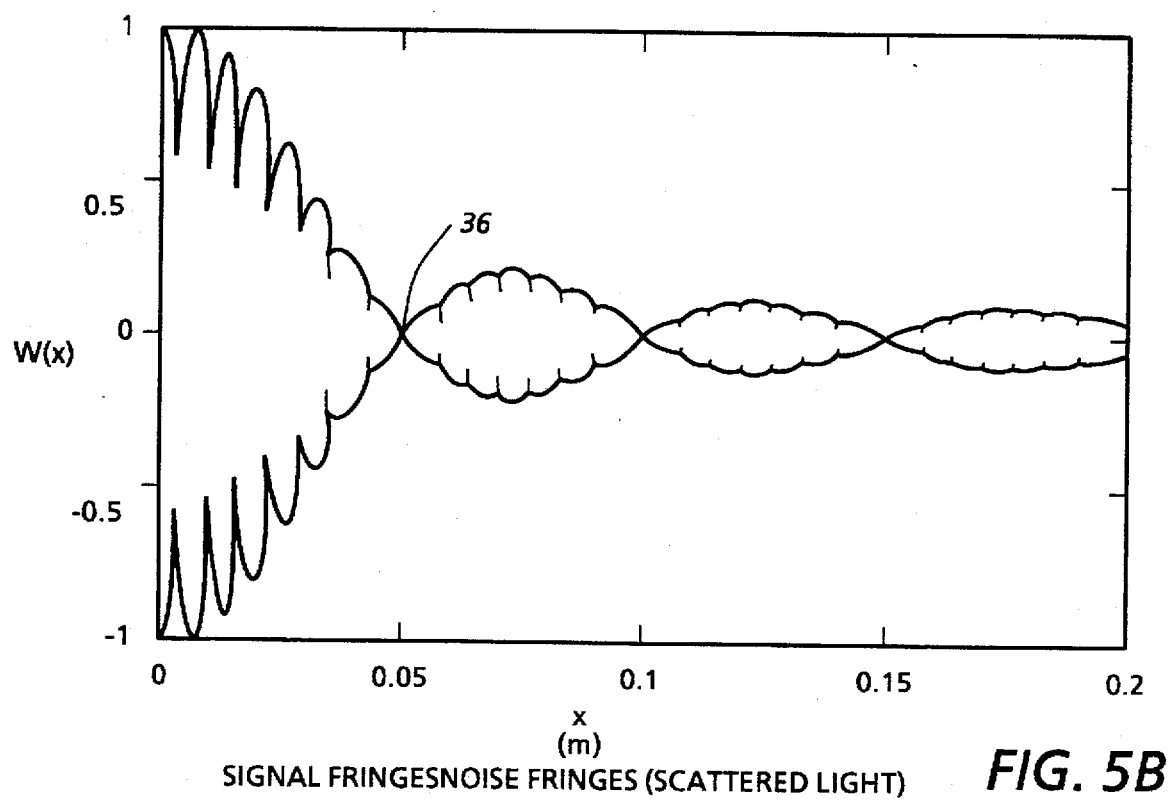
FIG. 5b is an interferogram from an input of Gaussian modes under a Gaussian envelope.

In the multi-mode case, the overall Gaussian/Lorentzian packet is the same as in the single-mode case, and the modulation term is the same, however, there is an intermediate structure due to the presence of many modes which is dependent only on the number of modes present, the frequency difference between modes, and the spectral profile of the modes. This causes the fringe intensity function to oscillate in addition to the modulation term. It is referred to as intermediate structure because, while the modulation term is oscillating on the order of microns, this term is oscillating on the order of centimeters while the overall Gaussian/Lorentzian packet approaches zero after many meters. I have thus discovered that if the individual modes are Lorentzian, as shown in FIG. 5a, the first zero 34 in the fringe intensity function is many centimeters greater than the first zero 36 if the modes are Gaussian (FIG. 5b). This is a very significant result for applications where it is desired to differentiate between the two cases. If the path difference in the interferometer is set to exactly 5.2 cm (the first zero in the Gaussian in FIG. 5b) then interference fringes will exist for the unscattered portion of the input (FIG. 5a) but the scattered "noise" will produce a constant background. FIG. 5a is the interferogram at the output of an interferometer assuming the input spectrum was made up of Lorentzian modes under a Gaussian envelope. FIG. 5b is the interferogram at the output of an interferometer assuming the input spectrum was made up of Gaussian modes under a Gaussian envelope.

Description of Invention

Figure 6A:
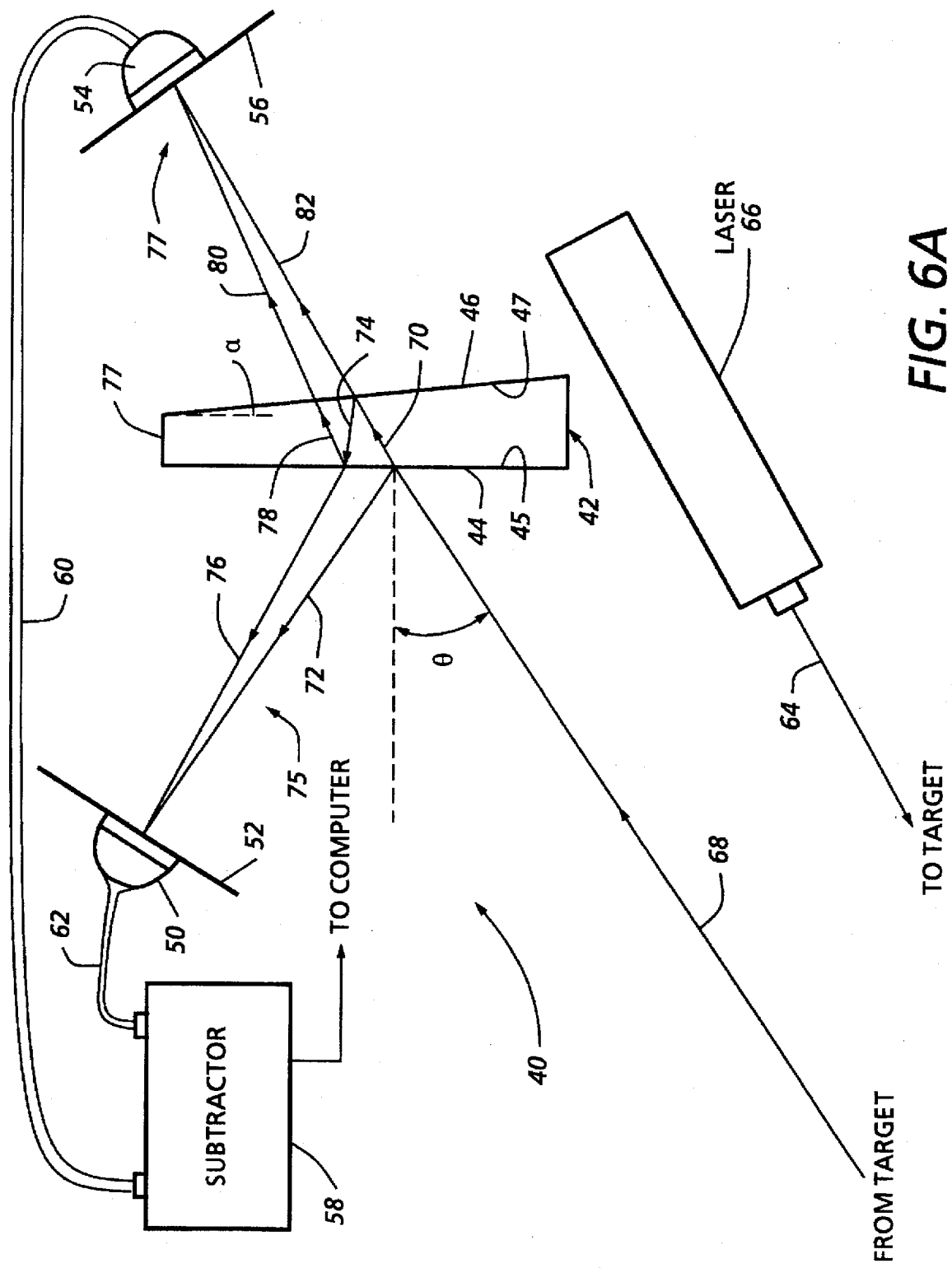
FIG. 6a is a functional diagram of the present invention with two focal planes and two CCD arrays (2-dimensional imaging system).
Figure 6B:
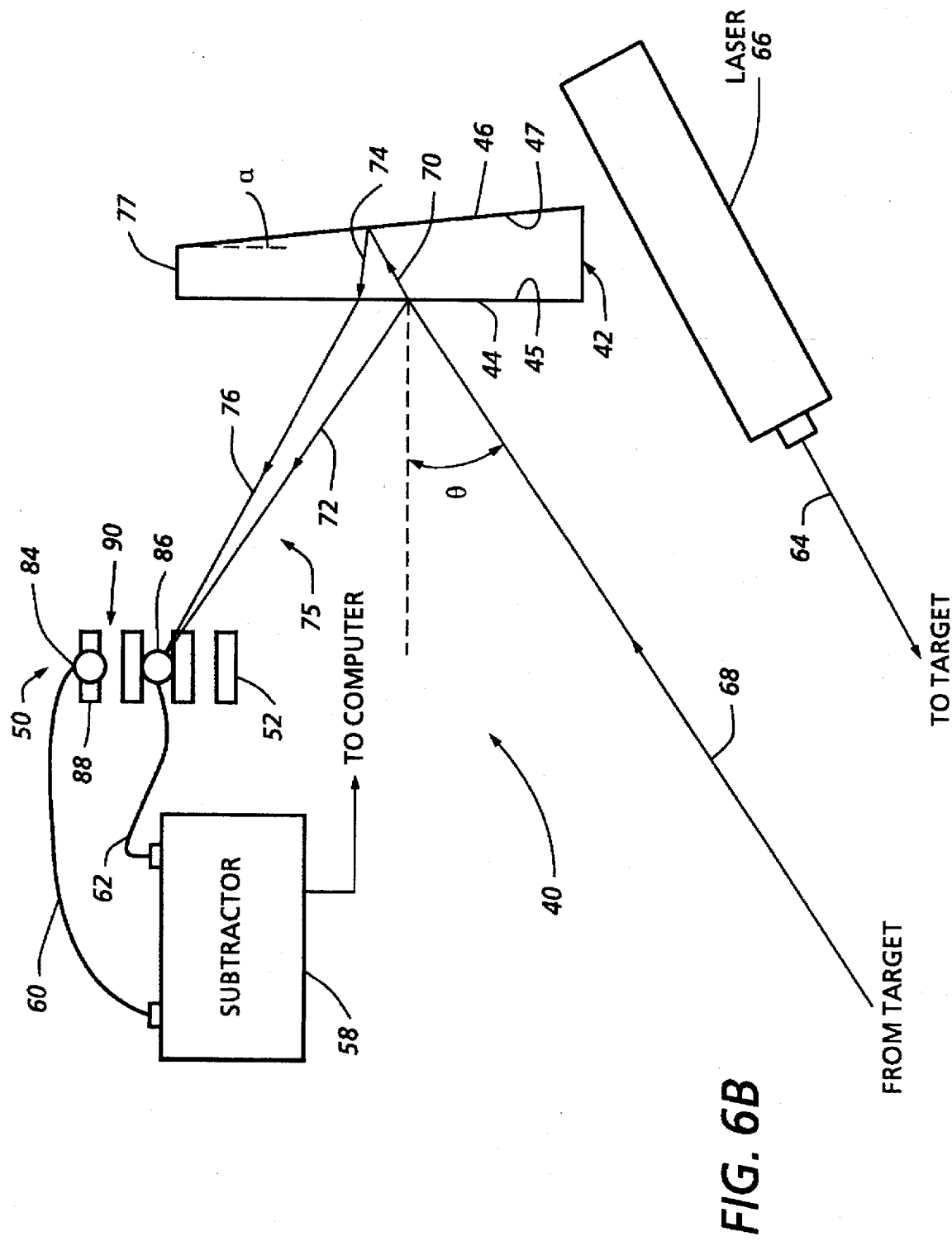
FIG. 6b is a functional diagram of the present invention with a single focal plane (0-dimension) system.

Schematics of two embodiments of the present invention are depicted in FIGS. 6a and 6b. FIG. 6a depicts the present invention, the interferometric image enhancement device (IIED) 10 for a two-dimensional system. The device 40 consists of the Fizeau wedge 42 which has the front surface 44, the internal side 45 of the front surface, the rear surface 46 and the internal side 47 of the rear surface.

The angle $\alpha$ is the pitch angle of the rear surface 46 of the Fizeau wedge 42. The angle $\theta$ is the angle of incident light reaching the front surface 44 of the Fizeau wedge 42. The device 40 additionally includes the CCD array 50 located at the first focal plane 52, and the CCD array 54 at the second focal plane 56. The CCD arrays 50 and 54 are connected to the electronic subtracter 58 by the cables 60 and 62, respectively.

Laser light 64 from the Lorentzian multi-mode laser 66 illuminates a target. The ray 68 representing laser light reflected from the target impinges on the front surface 44 of the Fizeau wedge 42 at the angle $\theta$ with the normal to the front surface 44. As ray 68 passes into the wedge 42 part of it is refracted as ray 70 through the material thickness of the wedge 42. The other part of ray 68 not entering the wedge 42 is reflected from the front surface 44 as the ray 72 which then travels to CCD array 50 at focal plane 52. Ray 70 splits up as it impinges on the internal side of rear surface 47. Part of ray 70 exits the rear surface 46 of wedge 42 as ray 82 which then travels to CCD array 54 at focal plane 56. The other part of ray 70 is reflected off the internal side of the rear surface 47 as ray 74 towards the internal side of the front surface 45. Part of ray 74 exits the front surface 44 of the wedge 42 as ray 76 which is then captured by the CCD array 50 at focal plane 52. The other part of ray 74 is reflected back off the internal side 45 of the front surface as ray 78 and exits the rear surface 46 of the wedge 42 as ray 80. Ray 80 travels to and is captured by the CCD array 54 at focal plane 56. Thus, CCD array 50 captures the interference pattern created by rays 72 and 76 while CCD array 54 captures the interference pattern of rays 80 and 82.

FIG. 6b depicts the interferometric image enhancement device 40 for a laser line-scan or zero-dimension system. The device 40 in this configuration consists of the Fizeau wedge 42 which has the front surface 44, the internal side 45 of the front surface, the rear surface 46 and the internal side 47 of the rear surface. The angle $\alpha$ is the pitch angel of the rear surface 46 of the Fizeau wedge 42. The angle $\theta$ is the angle of incident light reaching the front surface 44 of the Fizeau wedge 42. The device 40 additionally includes the focal plane 52 and the photo-diodes 84 and 86 located to detect at the dark band 88 and light band 90, respectively. The photo-diodes 84 and 86 are connected to the electronic subtracter 58 by the cables 60 and 62, respectively.

Ray 68 represents reflected light from the target. Ray 68 impinges on the front surface 44 of the wedge 42. Part of ray 68 enters the wedge 42 and is refracted towards the internal side 47 of the rear surface 46 as ray 70. Incident ray 70 reflects back through the wedge 42 as ray 74 which exits the wedge 42 through the front surface 44 and becomes the ray 76. The portion of incident ray 70 that does not enter the wedge 42 is reflected from the front surface 44 as ray 72. The rays 72 and 76 combine to form the image of the fringes at the focal plane 52.

Operation

With respect to FIG. 6a, the target is illuminated by the beam 64 from the laser 66 which has a Lorentzian spectrum. This is the two dimensional configuration of the invention. The light reflected from the target represented by ray 68 contains signal (unscattered light) and clutter or noise (scattered light). Ray 68 is incident on the solid Fizeau wedge 42 interferometer. Ray 72 reflects from the front surface of the wedge 42 and undergoes a phase shift of $\pi$. Ray 68 is transmitted through the front surface 44, internally refracted as ray 70, reflected off the internal side 47 of the rear surface 46 as the ray 74 and exiting the wedge 42 as ray 76. There is no phase-shift upon reflection from a more dense media (glass) to a less dense media (air) so the total phase shift for ray 76 is zero. If the optical path difference $\delta$, determined by the thickness and the angle of the wedge 42, is an integer multiple of the wavelength, then the ray 72 and the ray 76 comprising the arm 75 will interfere destructively producing a dark fringe at the center of focal plane 52. Similarly, there is no phase change between rays 80 and 82 comprising the arm 77, so they will interfere constructively producing a bright fringe at the center of focal plane 56. It is important to note that the intensity patterns at the two focal planes are 180 degrees out of phase. If the optical path difference between the interfering rays is exactly equal to the first zero 36 in FIG. 5b, then the interference patterns will be due only to the unscattered light. The scattered light will not interfere and will contribute a constant background to the intensity patterns. As shown in FIG. 6a, the configuration of the invention represents a range-gated system. The images detected by the CCD arrays 50 and 54 are subtracted by subtractor 58 pixel by pixel. This eliminates the background and retains the interference pattern due to the signal. The interference pattern is retained because the two patterns are 180 degrees out of phase. The output of subtractor 58 is fed to a computer for further processing. The image can be reconstructed from the interference information by applying the Fast-Fourier transform. The setup of this "two arm" (75 and 77) invention configuration is difficult because the alignment of the CCD arrays 50 and 54 is critical. Also, the coatings on the front 44 and rear 46 surfaces of the Fizeau wedge 42 must be optimized so that the relative intensities of the four rays 72, 76, 80, and 82 are equal.

FIG. 6b is the one-dimensional or scanner configuration of the present invention. The description of the wedge 42 and its effects on the impinging ray 68 both internally and externally are as described above in regard to FIG. 6a except for the discussion relating to rays 80 and 82 emerging from the rear surface 46 of wedge 42 as arm 77.

In FIG. 6b, the rays 72 and 76 converge on the focal plane 52. The photodiodes 86 and 84 detect the light fringes 90 and the dark fringes 88, respectively. The outputs of the diodes 86 and 84 are fed via cables 62 and 60, respectively to the subtractor 58. The signals output from diodes 84 and 86 comprising the array 50 are subtracted so that the scattered light constituting the background picked up by diodes 84 and 86 is removed leaving the unscattered light or reflected signal which produced the fringes. The output of the subtractor 58 is fed to a computer for image reconstruction.

The structure and method disclosed herein illustrate the principles of the present invention. The invention may be embodied in other specific forms without departing from its spirit or essential characteristics. The embodiment of the invention described herein is to be considered in all respects as exemplary and illustrative rather than restrictive. Therefore, the appended claims rather than the foregoing description define the scope of the invention. All modifications to the embodiment described herein that come within the meaning and range of equivalence of the claims are embraced within the scope of the invention.

What I now claim as my invention is:

1. An optical discriminating apparatus for filtering scattered light from combined reflected light containing light reflected from a target and said target's ambient and scattered light representing background and noise comprising:
    a coherent light source containing substantially more Lorentzian than Gaussian spectral component for illuminating said target;
    an optical means for separating scattered light from combined reflected light containing light reflected from said target and scattered light, said optical means located relative to said light source and said target so that sufficient light from said light source reflected from said target is intercepted by said optical means to produce an interferogram at a focal plane; and
    a means for detecting and subtracting out the scattered light from the combined reflected light separated by said optical means, said detecting and subtracting means located relative to said optical means in the focal plane where light rays emerging from said optical means converge to form fringes representing said combined reflected light and the scattered light.

2. The apparatus of claim 1 wherein said coherent light source is a laser.

3. The apparatus of claim 2 wherein said coherent light source is an argon-ion laser.

4. The apparatus of claim 1 wherein said coherent light source provides Lorentzian spectral output that is maximized relative to any Gaussian spectral content.

5. The apparatus of claim 1 wherein said coherent light source has its Lorentzian spectral content maximized and its Gaussian spectral content minimized or eliminated.

6. The apparatus of claim 1 wherein said optical means for separating is an interferometer having an optical path difference $\delta$.

7. The apparatus of claim 6 wherein the optical path difference is optimized for the laser used.

8. The apparatus of claim 6 wherein the optical path difference $\delta$ through said optical means for separating is determined by the location of the first zero in the Gaussian fringe intensity function for the scattered light.

9. The apparatus of claim 8 wherein the first zero in the Gaussian fringe intensity function for the scattered light is determined from the equation $$\frac{1}{2N+1} \left\{ 2 \sum_{n=0}^{N} \left\{ \cos\left(\frac{nx\Delta}{c}\right) \right\} - 1 \right\}$$

10. The apparatus of claim 6 wherein said interferometer is a Fizeau wedge.

11. The apparatus of claim 10 wherein the wedge angle $\alpha$ and the incidence angle $\ominus$ are adjusted to obtain equal length optical path differences between the refracted ray 70 and the doubly internally reflected ray 78 through said wedge.

12. The apparatus of claim 1 where said means for detecting and subtracting out the scattered light from the combined reflected light containing light reflected from said target and said target's ambient and scattered light comprises two photo detectors, located at said focal plane where said light rays converge to form said fringes, and where said fringes are 180 degrees out of phase with each other.

13. The apparatus of claim 6 where said interferometer is a one-arm, two detector system having an interferogram output of alternating light and dark fringes in a focal plane in said arm and where one detector is placed at the position of a light fringe in said focal plane and where one detector is placed at the position of a dark fringe in said focal plane.

14. The apparatus of claim 6 wherein said interferometer is a two-arm system having two outputs and a detector in each of said arms to produce an output for each said arm and where the optical characteristics reflectivity and transmissivity of the interferometer are optimized to produce equal total intensities at the two outputs.

15. An optical apparatus for filtering scattered light from combined reflected light containing light reflected from a target immersed in a liquid and said target's ambient and scattered light representing background and noise comprising:

a laser having substantially more Lorentzian than Gaussian spectral component for illuminating said target;

a Fizeau wedge having a thickness and configuration sized to provide an optical path difference δ through said wedge equal to the distance to the first zero in the Gaussian fringe intensity function for the scattered light, said wedge located relative to said target and said laser so that said wedge receives sufficient reflected laser light from said target to produce an interferogram;

a means for detecting the fringes and the background illumination exiting said wedge, said means located in the focal plane where rays emerging from said wedge converge to form the fringes; and a means for subtracting detected fringes and detected background.

16. A method of making an optical discriminating apparatus for filtering scattered light from combined reflected light containing light reflected from a target and said target's ambient and scattered light representing background and noise to produce a filtered target signal, said method comprising the steps of:

selecting a coherent light source having its Lorentzian spectral content maximized and its Gaussian spectral content minimized or eliminated;

selecting an interferometer configuration having highly stable optical characteristics and having an optical path difference δ determined by the location of the first zero in the Gaussian fringe intensity function for the scattered light, said interferometer configuration having a focal plane for forming an interferogram of fringes representing combined reflected light and scattered light;

selecting a means for detecting and subtracting said fringes representing scattered light from said fringes representing combined reflected light; and arranging said light source, said selected interferometer, and said means for detecting and subtracting relative to each other such that when a target immersed in a liquid is illuminated by said light source, the combined reflected and scattered light reaching said interferometer from said target traverses the optical path difference through said interferometer, emerges therefrom and converges at a focal plane where said detecting and subtracting means is positioned to produce the filtered target signal.

17. The method of claim 16 wherein said interferometer is a Fizeau wedge.

* * * * *